H. C. DODGE & C. G. OSTEMAN.
STOP MECHANISM FOR LATHES.
APPLICATION FILED MAR. 31, 1916.
1,249,275.
Patented Dec. 4, 1917.
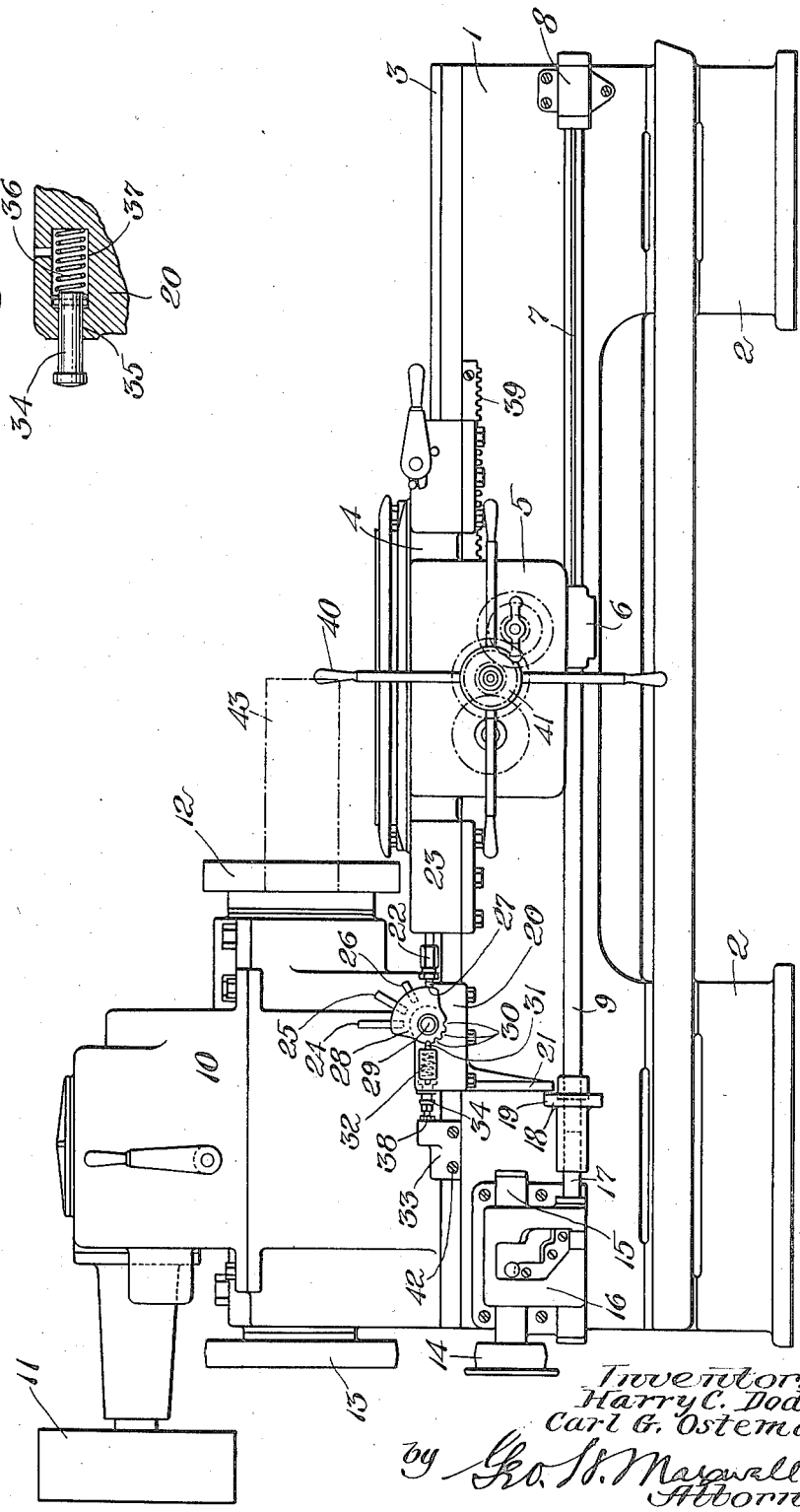

UNITED STATES PATENT OFFICE.

HARRY C. DODGE AND CARL G. OSTEMAN, OF BOSTON, MASSACHUSETTS; SAID OSTEMAN ASSIGNOR TO SAID DODGE.

STOP MECHANISM FOR LATHES.

1,249,275.         Specification of Letters Patent.         Patented Dec. 4, 1917.

Application filed March 31, 1916. Serial No. 88,086.

*To all whom it may concern:*

Be it known that we, HARRY C. DODGE and CARL G. OSTEMAN, citizens of the United States, and residents of Boston, Massachusetts, have invented an Improvement in Stop Mechanism for Lathes, of which the following description, in connection with the accompanying drawings, is a specification, like letters on the drawings representing like parts.

Our present invention is an improvement in turning lathes, particularly in the construction and arrangement of the stop mechanism, enabling the carriage carrying the work or tool to be fed automatically for a predetermined distance, then to disconnect the automatic feed and enable a further feeding movement, by hand or otherwise, to be effected for a fixed extent. Other features of the invention are to provide adjustable means which will vary the automatic feeding as desired, without varying the additional limit of feeding to which the apparatus may be set. Further features of the invention, advantages and details of construction will be hereinafter more fully pointed out and claimed.

Referring to the drawings illustrating a preferred embodiment of the invention,

Figure 1 is a side view of a turning lathe;

Fig. 2 being an enlarged detail in cross section.

While our novel mechanism may be utilized on any standard type of lathe, we have herein illustrated the same as embodied in a special type of machine lathe, particularly adapted for machining the shell portion of projectiles, although it is obviously useful for other work. The lathe table 1 is mounted on legs 2 and carries tracks 3 on which the carriage 4 is mounted to slide, said carriage having a bracket 5 and threaded lug 6 engaged by a feed shaft 7 mounted in bearings 8 and 9 at the side of the table 1. Rotation of the feed shaft 7 moves the carriage 4 on the slideways, as usual. At one end of the table are the gears and feeding mechanism mounted in an upstanding portion 10 and adapted to be driven by a pulley 11 belted to any suitable source of power to rotate the chuck 12 carrying the work. Detailed description and illustration of said gears not being a part of the present invention and being well-known, are not herein illustrated. To drive the feed shaft 7 a pulley 13 rotated by the mechanism within the casing 10 is belted to a pulley 14 rotating the short shaft 15 mounted adjacent one end of the feed shaft 9 and carrying any suitable differential or driving means within the casing 16 adapted to rotate the shaft 17 and to be operatively connected to and disconnected from the feed shaft 9 by the longitudinal movement of a clutch 18. Slidably mounted on one of the tracks 3 is a block 20 carrying a depending arm 21 adapted to contact with the flange 19 on the clutch 18 and disconnect the shaft 17 from the feed shaft 9 by moving the clutch to the left, viewing Fig. 1. Such movement of the block 20 is imparted by the carriage 4, as it reaches the predetermined movement in its line of travel. To this end a lug 22 is fitted on a bracket 23 carried by the carriage 4 and in the line or path of movement to contact with one of a series of members 24, 25, 26 or 27 of different lengths, all carried by a segmental member 28 rotatably mounted on a stud 29 carried by the sliding block 20. The movement of the carriage 4 and the striking of the lug 22 against any of the members carried by the segment 28 acts to move the block 20 to the left during the continued feeding movement of the carriage 4 until the arm 21 on said block engages with the flange 19 of the clutch and moves said clutch to disconnect the rotative movement of the feed shaft 9, whereupon the automatic feeding of the carriage is stopped. The varying lengths of the members 24, 25 and 26 enable a considerable range of adjustment to be quickly effected for a disconnecting movement without altering the adjustments of the other portions of the mechanism. To hold the segment 28 in adjusted position, a series of grooves 30 are provided, adapted to be engaged by a spring-pressed plunger 31, carried in a groove in said block 20 and normally actuated by a spring 32 to hold the plunger 31 into any one of said grooves while a slight manual movement will disconnect the locking engagement of the plunger and a groove, and permit partial rotation of said segment to bring another one of the adjustable members into the path of movement of the stud 22. In many lines of work, particularly in machining the shells for projectiles, it is desirable to complete the final feeding movement of the carriage 4 by hand, and our invention provides means for this purpose, comprising an adjustable fixed stop 33, against which the block 20 may be further moved after the disconnection of the automatic power feeding actuation, as already described. To facilitate this operation, as well as to restore the sliding member 20 in desired position for the automatic disconnection of the feed shaft, we provide a yielding plunger 34 mounted to slide in a groove 35 in the block 20 and to be normally pressed outwardly by a coiled spring 36 within an enlarged recess 37 so that said plunger will be in line with the fixed stop 32 or an adjustable member 38 carried thereby. To effect a hand-feeding movement of the carriage 4, the usual rack 39, handles 40 and feeding gear connections 41 are shown, which may be of usual and ordinary construction.

In the operation of a lathe with our improved adjustable stop arrangement, the fixed stop 33 is positioned by tightening a set screw 42 exactly in the point desired for the final stopping of the carriage, the shell or other work indicated in dotted lines at 42 being positioned in the chuck 12 and rotated, the carriage 4 carrying the tools (not shown). Either of the stops 24, 25 or 26 are positioned and the mechanism started, the spring 36 restoring the sliding block 20 carrying the same forwardly to free the clutch 18 of contact with the arm 21. The tool mounted on the carriage 4 is fed through rotation of the shaft 7, until the lug 22 strikes against the segment 28 or one of said arms and thereupon moves the sliding block 20 to the left, disconnecting the clutch 18. Thereafter the carriage may be fed by hand until the block 20 and carriage 4 are brought to a final stop by the member 33.

Various adjustments to disconnect the power feeding without changing the final stopping of the block 20 may be effected by moving the segment 28, which is held in locked position where so moved by engagement with the spring-pressed plunger 31. Our invention is of special value in many lines of work, where the final machining must be fed by hand to enable the operator to "feel" the action of the tool and work and prevent breakage, especially where hardened steel or composition shells are being machined, as above explained.

Our invention is further described and defined in the form of claims as follows:—

1. In a lathe of the kind described, a carriage, automatic means to feed said carriage, a stop adjustable on a fixed part of the machine to limit the feeding movement of said carriage, mechanism to disconnect the automatic feeding before the limit of feeding movement controlled by said fixed stop is reached, consisting in a slidable block on said carriage, a segment pivoted to said block, a plurality of adjustable members of different lengths carried by said segment, means to hold said segment in position for a selective one of said members to disconnect the automatic feeding of the carriage, in combination with means permitting a further manual feeding of the carriage to the limit of movement afforded by said fixed stop.

2. In a lathe of the kind described, a carriage, automatic means to feed said carriage, a stop adjustable on a fixed part of the machine to limit the feeding movement of said carriage, mechanism to disconnect the automatic feeding before the limit of feeding movement controlled by said fixed stop is reached, consisting in a slidable block on said carriage, a segment pivoted to said block, a plurality of adjustable members of different lengths carried by said segment, means to hold said segment in position for a selective one of said members to disconnect the automatic feeding of the carriage, in combination with a spring pressed plunger carried by the sliding block arranged to strike said stop and having sufficient tension to disconnect the automatic feed while permitting further feeding of the carriage during compression of said spring.

In testimony whereof, we have signed our names to this specification, in the presence of two subscribing witnesses.

HARRY C. DODGE.
CARL G. OSTEMAN.

Witnesses:
   PERCY H. YOUNG,
   H. L. NEWTON.